July 16, 1929.  J. R. METCALF  1,720,964
COMPASS CARD
Filed Feb. 20, 1924
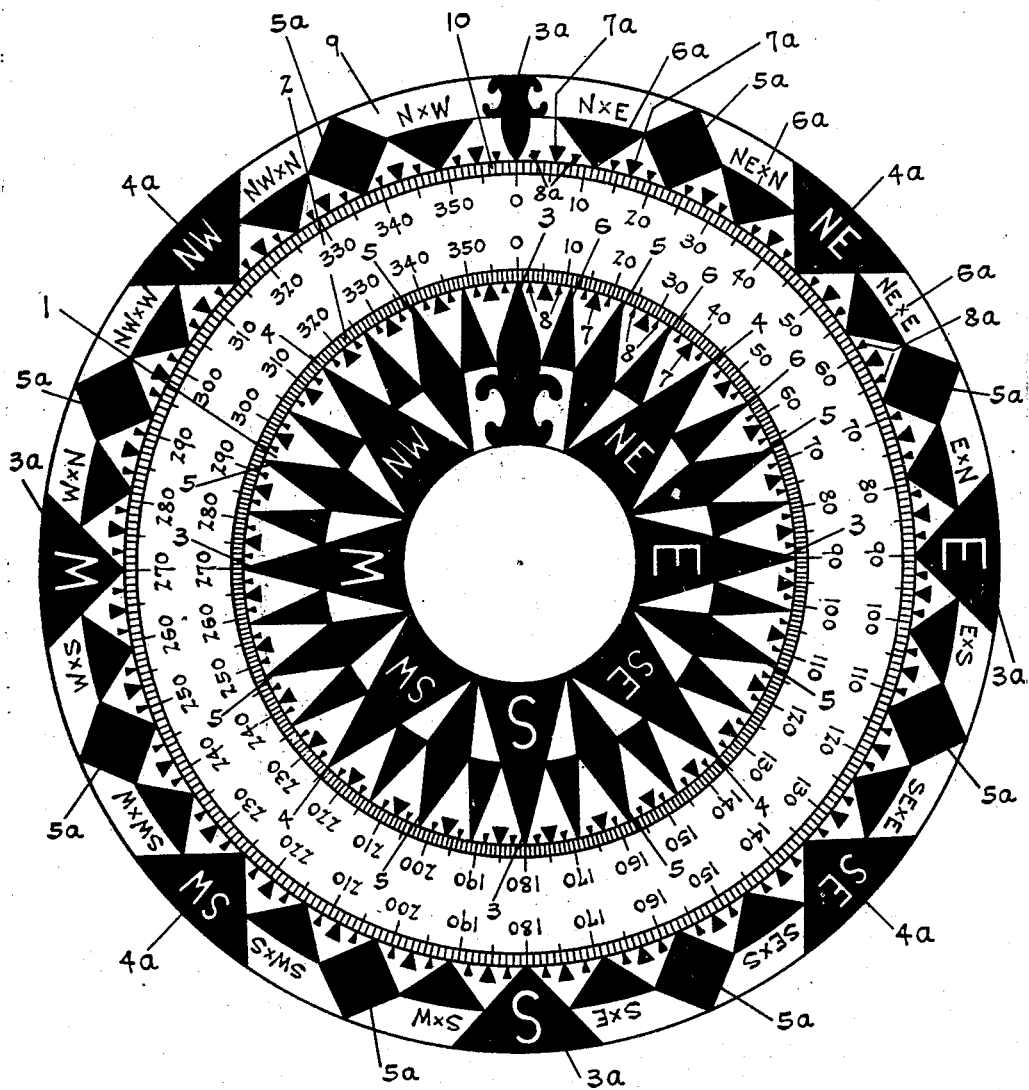
Inventor:
John R. Metcalf
By W. R. Lord
Attorney Patented July 16, 1929.

1,720,964

UNITED STATES PATENT OFFICE.

JOHN R. METCALF, OF ERIE, PENNSYLVANIA.

COMPASS CARD.

Application filed February 20, 1924. Serial No. 693,996.

This invention is designed to simplify compass cards so that they may be more easily read. With the ordinary compass course diagram there is the inner compass card corresponding in marking to the ordinary compass and surrounded by an outer compass card. In such cards as heretofore made the outer compass card does not correspond in form to the inner compass card and consequently errors are very easily made in the reading thereof.

In the carrying out of my invention I make the compass card with the usual points, many of which are of triangular form and make the outer compass card of the same form as the inner compass card but with the markings of the points inverted. Thus the cardinal and intercardinal points are preferably of the usual triangular shape and of greater depth than the intervening $11\frac{1}{4}°$-points, and the $22\frac{1}{2}°$-points have the usual diamond form corresponding to the diamond form of the inner compass card. Thus confusion is avoided in reading the diagram.

The invention is illustrated in the accompanying drawing which shows a plan view of the compass course diagram. This is formed with an inner compass card 1, having the usual surrounding scale of degrees 2. The inner compass card has the cardinal points 3, the intercardinal points 4, the $22\frac{1}{2}°$ points 5, and the $11\frac{1}{4}°$ points 6 with the usual half-point and quarter-point markings 7 and 8 respectively. These follow exactly the usual compass markings, that is to say, the cardinal points 3 and intercardinal points 4, except north, are of triangular shape and have the full radial depth of the point portion of the card. The $22\frac{1}{2}°$ points 5 are of the usual diamond form and the $11\frac{1}{4}°$ points 6 are of the usual triangular shape but of less depth, usually about half the depth of the triangular shaped cardinal and intercardinal points. The half-point markings are much smaller than the $11\frac{1}{4}°$ point markings and the quarter-point markings smaller than the half-point markings in the usual manner.

The outer compass card has the cardinal points $3^a$ and the intercardinal points $4^a$. These are large triangles extending the full radial depth of the point portion of the outer compass card in a manner similar to the same points on the inner compass card. Between these triangular shaped cardinal and intercardinal points are the inverted $22\frac{1}{2}°$ points $5^a$. These are of diamond form corresponding to the form of the $22\frac{1}{2}°$ points on the inner compass card. The $11\frac{1}{4}°$ points $6^a$ are in the form of inverted triangles, the bases of the triangles extending from the angles at the sides of the diamonds of the $22\frac{1}{2}°$ points in the same manner as on the inner compass card and in the manner of marking usually found on compasses except that they are inverted. Between the compass points are the half-point and quarter-point markings $7^a$ and $8^a$, these being of less depth than the $11\frac{1}{4}°$ points and corresponding in this respect with the similar half-point and quarter-point markings of the inner compass card. Thus the markings on the outer compass card correspond exactly to the markings of the inner compass card and thus to the usual markings of the compass except that the markings of the outer compass card are inverted.

The outer compass card 9 has the degree scale 10 with the points corresponding exactly to the scale surrounding the inner compass card except that it is inverted.

What I claim as new is:—

1. A compass course comprising an inner compass card having compass points comprising some of triangular shape and a degree scale indicated thereon; and an outer compass card surrounding the inner compass card and fixed therewith and having points some of triangular shape and a degree scale radially separated from and corresponding to the inner compass card, the triangular points on the outer compass card being similar in form to the points on the inner compass card but inverted relatively to the points on the inner compass card and the degree scales on each card being related to the points.

2. A compass card comprising an inner compass card having compass points comprising some of triangular shape indicated thereon; and an outer compass card fixed with and surrounding the inner compass card and having cardinal points, intercardinal points, $22\frac{1}{2}°$ points, and $11\frac{1}{4}°$ points thereon separated radially from and corresponding to the points on the inner compass card, said outer compass card comprising some points of triangular shape, said points being inverted relatively to the corresponding points on the inner compass card, the cardinal, intercardinal and 22½° points being of greater radial depth than the 11¼° points, said cards having degree scales thereon related to said points.

3. A compass card comprising an inner compass card having compass points comprising some of triangular shape indicated thereon with cardinal points of triangular form, and 22½° points of diamond form; and an outer compass card surrounding the inner compass card and fixed therewith having cardinal points of triangular form inverted relatively to the cardinal points on the inner compass card and 22½° points of diamond form, said cards having degree scales thereon related to said points on the respective cards.

4. A compass card comprising an inner compass card having compass points comprising some of triangular shape indicated thereon, the cardinal and intercardinal points being of triangular form and the full radial depth of the point portion of the card, the 22½° points being of diamond form and of full radial depth of the point portion of the card, and the 11¼° points being of triangular form and of less depth than the cardinal and intercardinal points; and an outer compass card surrounding the inner compass card fixed therewith and having cardinal and intercardinal points of triangular form and of full radial depth of the point portion of the outer compass card, the 22½° points of diamond form and full radial depth of the point portion of the outer compass card and the 11¼° points of triangular form and of less radial depth than the point portion of the outer compass card, the points of the outer compass card being spaced radially from the points of the inner compass card and inverted relatively thereto, said cards having degree scales thereon related to said points on the respective cards.

In testimony whereof I have hereunto set my hand.

JOHN R. METCALF.